United States Patent [19]

Bayerlein et al.

[11] Patent Number: 4,840,811
[45] Date of Patent: Jun. 20, 1989

[54] PROCESS FOR PRODUCING COLORLESS, ODORLESS AND TASTELESS CASSIA ENDOSPERM FLOUR

[75] Inventors: Friedrich Bayerlein, Krailling; Nikolaos Keramaris, Eichenau; Nikolaus Kottmair, Gauting; Manfred Kuhn, Munich, all of Fed. Rep. of Germany; Michel M. Maton, Vaucresson, France

[73] Assignee: Diamalt Aktiengesellschaft, Munich, Fed. Rep. of Germany

[21] Appl. No.: 100,820

[22] Filed: Sep. 25, 1987

[30] Foreign Application Priority Data

Oct. 10, 1986 [DE] Fed. Rep. of Germany ....... 3634645

[51] Int. Cl.$^4$ ................................................ A23L 1/04
[52] U.S. Cl. .................................... 426/430; 426/573; 426/575; 426/429
[58] Field of Search ................ 426/429, 430, 431, 573

[56] References Cited

U.S. PATENT DOCUMENTS

| | | | |
|---|---|---|---|
| 2,234,063 | 3/1941 | Rolle | 426/430 |
| 2,512,663 | 6/1950 | Masurovsky | 426/430 |
| 3,767,424 | 10/1973 | Shimizu | 426/431 |
| 4,148,928 | 4/1979 | Sodini et al. | 426/430 |
| 4,427,707 | 1/1984 | Heine et al. | 426/573 |
| 4,518,708 | 6/1979 | Chiovini | 426/430 |
| 4,661,475 | 4/1987 | Bayerlein et al. | 514/54 |
| 4,746,528 | 5/1988 | Prest et al. | 426/573 |

*Primary Examiner*—Jeanette Hunter
*Attorney, Agent, or Firm*—Robbins & Laramie

[57] ABSTRACT

A process for producing colorless, odorless and tasteless cassia endosperm flour is revealed in which the endosperm is extracted at least once, either in a whole or comminuted state, with a mixture of (a) water, and (b) alkanol and/or acetone.

20 Claims, No Drawings

PROCESS FOR PRODUCING COLORLESS, ODORLESS AND TASTELESS CASSIA ENDOSPERM FLOUR

The present invention relates to a process for producing flour from the endosperm of cassia, which has proven to be a highly advantageous gelling and thickening agent for aqueous systems, especially in the area of food and fodder. Gelling and thickening agents are understood to be substances that are added to water or aqueous processing fluids, or to solid or liquid food or fodder, for example, during the production and processing stage, in order to achieve a desired consistency or viscosity. In the field of food in particular, flour made of cassia endosperm is characterized by its gelatinizing interaction with other hydrocolloids, by a high degree of efficiency and by the particularly low concentration needed.

In DE-OS No. 33 35 593, gelling and thickening agents based on cassia galactomannans are described which contain a synergistic mixture of cassia galactomannans and carrageenan, agar and/or xanthan.

DE-OS No. 33 47 469 describes substituted alkyl ethers of the polysaccharides that appear in the endosperm of cassia tora and their use as a thickening agent in printing pastes for textile printing.

Cassia flour is extracted from the seeds of cassia tora or from its synonymous plants, e.g., cassia obtusifolia, through heating the ripe seeds and then pulverizing them. This treatment results in the separation of the seedling and the endosperm hull. The endosperm, which is isolated from the seedling and hull fragments by sifting, is then subjected to a pulverization process. Cassia endosperm flour is thus obtained with an average composition of:

Water: 3–12%
Fat Up to 1%
Raw Protein: Up to 7%
Raw Fiber: Up to 4%
Ash: Up to 2%
Residual polysaccharide: at least 75%

Although the cassia endosperm flour extracted in this way does have the desired gelling property, it nonetheless retains a specific fruity aroma and a slightly bitter taste. Moreover, the flour obtained in this way has a yellow-to-brown color, so that its use in the production of high quality products is limited.

DE-OS No. 31 14 783 describes the production of carob pod, carob kernel or guar flour with an improved taste. In this process, the dried (and where applicable, toasted and ground) base material is subjected to high-pressure extraction with supercritical $CO_2$. However, the application of this process to cassia flour yields inadequate results.

Thus far, it has not been possible either through selection or through selective pulverization and other mechanical purification processes to successfully produce cassia flour which is practically colorless, odorless and tasteless, which is largely free of anthraquinone attendant substances, and which maintains its synergistic gelling property. For this reason, the cassia flour produced by prior methods is unsuitable as an additive to high-quality, sensorily sophisticated food products.

In many areas of modern food technology, it is desirable to use appropriate additives to lend food products a gelatinous consistency. In imparting a gelatinous consistency to food products, it is only natural that these additives should not affect the product in terms of either taste or color. It is not desired to affect the food taste or color since it could result in products that are no longer acceptable to the consumer. A specific odor of the gelling agent also places restrictions on its applicability, since products with a foreign odor are frequently not acceptable to the consumer as well.

The object of the present invention is thus to present a process for producing cassia endosperm flour that is colorless, odorless and tasteless.

The subject of the present invention is a process for producing cassia endosperm flour from the endosperm of cassia tora which is practically colorless, odorless and tasteless, and which has a high synergistic gelling property when combined with carageenan, xanthan and/or polyacrylates. In the process of the present invention, the endosperm is extracted at least once, either in a whole or comminuted state, with an extraction liquid which comprises a mixture of (a) water and (b) alkanol and/or acetone, and converted to the desired degree of fineness after drying. As used herein, the term "cassia tora" is understood to mean cassia tora or its synonymous plants, such as cassia obtusifolia.

In this manner, the undesirable substances contained in the unprocessed cassia endosperm flour are separated into the extraction liquid, while cassia endosperm flour with the desired properties remains after the extraction process.

The preferred alkanols are ethanol, isopropanol and propanol. The extraction according to the invention is conducted at least once, preferably twice, and most preferably three times, whereby the water content of the extraction liquid generally amounts to between about 5% and 90%. In the preferred repeated extraction process, the water content is successively lowered in the course of the extractions, so that the water content of the mixture used in the first extraction is about 40% to about 60%, the water content of the mixture used in the second extraction is about 20% to about 40%, and the water content of the mixture used in the third extraction is about 5% to about 15%.

In another preferred embodiment, the extraction can be conducted continuously. It is especially preferred to use a countercurrent extraction. Preferred extraction equipment according to the invention are percolators, band extractors, rotation extractors and similar continuously operating devices.

In a particularly preferred embodiment, small quantities (up to 1%) of a reducing agent are added to the extraction liquid. Examples of such reducing agents are dithionites, sulfites, ascorbic acid and others.

In another preferred embodiment, small quantities of a soluble, alkaline substance are added to the extraction liquid. Substances such as alkali carbonates, sodium hydroxide, potassium hydroxide or ammonia can be used as alkaline substances.

The additives, i.e., reducing agents and/or alkaline substances, function to allow better separation of the undesirable substances as more easily soluble forms. Thus, the desired end product, cassia endosperm flour, will be obtained in a purer form.

The process according to the invention is preferably conducted at slightly elevated temperatures, generally between about 25° C. and 35° C., with approximately 30° C. being especially preferred.

In the extraction process according to the invention, the cassia endosperm flour is separated through filtration or through centrifugation, and then dried carefully.

Using the process according to the invention, a product is obtained which has the desired properties, namely colorlessness, odorlessness and tastelessness. The process is generally recognized as safe in terms of health, which can play an important role in additives to food products.

Surprisingly, it was discovered that not only did the cassia endosperm flour produced according to the invention retain its original advantageous properties—namely, its high synergistic gelling property with carrageenan, xanthan and/or polyacrylates—its gelling force was even increased as a result of the production of the present invention.

Within the context of the present invention, the F.I.R.A. Jelly Tester (H. A. Gaydon & Co., Ltd., Wallington, Surrey, England, cited in Martin Glicksman: "Gum Technology in the Food Industry," Academic Press, New York, N.Y., page 82 (1969)) was used for the gel measurements. The F.I.R.A. Jelly Tester basically consists of a narrow metal blade on which is mounted a shaft, which has a precise and easily readable scale that is calibrated from −10 to +90 angular degrees. The entire device can be rotated through the application of torsional force. This torsional force is generated by flowing water, which runs at a given rate of velocity into a small container with a counterweight that is connected to a shaft with a draw-bar. Gel strength is measured by submerging the metal blade into the gel and leaving it there for as long as water flows into the small container, until the metal blade rotates to a certain angle. The greater the amount of water that is needed to attain the given angle of deformation, the higher the gel strength. In the examples noted, the angle of deformation is 30°, and the amount of water needed to achieve this angle of deformation is indicated in ml (=g).

In measuring the gelling force of the cassia endosperm flour obtained according to the invention, 1:1 mixtures of cassia endosperm flour and commercially available kappa-carrageenan were produced. In each case, six parts of these gel mixtures were stirred into 1,000 parts of water at room temperature with a high-speed mixer. The mixture was then heated in a beaker for five minutes to a temperature of 85° C. while being stirred slowly. The water loss resulting from heating was balanced out by adding hot water just before cooling. The still-hot, slightly viscous solutions were poured into the measuring bowl of the F.I.R.A. Jelly Tester. After cooling to 20° C. in the thermoregulator, gel strength was measured in the form of the number of ml (=g) of water necessary in order to move the scale on the testing device by 30°.

The starting material used for the examples was cassia endosperm flour with a yellow-to-brown color, a fruity odor and a bitter taste. The gel strength came to 80 g (F.I.R.A. Jelly Tester method, 1:1 with carrageenan (0.6%)).

The increase in the synergistic gelling force of the cassia endosperm flour produced according to the present invention represents a significant advantage for the wide applicability of the product. As a result of this property, a gelling agent can be incorporated into high-quality food products which has an advantage over previously known products. This property results in an increased efficiency, which is in fact desirable for applications in food technology.

EXAMPLE 1

An isopropanol/water mixture consisting of:
4,000 parts isopropanol
5,000 parts water
900 parts cassia endosperm flour
was suspended and stirred at room temperature for 30 minutes. The solution was then filtered, and the filter cake was dried in a drying chamber at 100° C. to a residual moisture level of 8%. The cassia endosperm flour obtained in this way was slightly colored, odorless and had an improved taste. Gelling force was 90 g.

EXAMPLE 2

An isopropanol/water mixture consisting of:
4,000 parts isopropanol
5,000 parts water
1,500 parts cassia endosperm flour
was suspended and stirred at 30° C. for 30 minutes. The solution was then filtered until 8,000 parts filtrate had been collected. The still-moist filter cake was again suspended in an isopropanol/water mixture consisting of 3,500 parts isopropanol and 1,500 parts water, and stirred at 30° C. for 30 minutes. It was filtered and dried to a residual moisture level of 8%. The cassia endosperm flour obtained in this way was practically colorless and had a neutral odor and taste. Gelling force was 95 g.

EXAMPLE 3

An ethanol/water mixture consisting of:
4,000 parts ethanol
5,000 parts water
1,000 parts cassia endosperm flour
was suspended. Two parts sodium dithionite and one part potassium carbonate were then added, and the solution was stirred at 30° C. for 30 minutes. The solution was filtered until the volume of the collected filtrate amounted to 8,500 parts. The moist filter cake was suspended in an ethanol/water mixture consisting of 3,500 parts ethanol and 1,500 parts water, and after 30 minutes of stirring was again filtered until the volume of the collected filtrate amounted to 4,600 parts. The filter cake was suspended in yet another ethanol/water mixture consisting of 1,800 parts ethanol and 200 parts water, and after 30 minutes of stirring at room temperature was filtered until the volume of the filtrate amounted to 2,000 parts. The filter cake was dried to a residual moisture level of 8%. The cassia endosperm flour obtained in this way was practically colorless and had a neutral odor and taste. The sample tasting conducted by several persons yielded a very good, positive assessment. Gelling force was 100 g.

EXAMPLE 4

An acetone/water mixture consisting of
4,000 parts acetone
5,000 parts water
1,500 parts cassia endosperm flour
was suspended and stirred at 30° C. for 30 minutes. The solution was then filtered until 8,000 parts filtrate had been collected. The still-moist filter cake was again suspended in an acetone/water mixture consisting of 3,500 parts acetone and 1,500 parts water, and stirred at 30° C. for 30 minutes. It was filtered and dried to a residual moisture level of 8%. The cassia endosperm flour obtained according to Example 4 was practically colorless and had a neutral odor and a neutral, pleasant taste. Gelling force was 101 g.

EXAMPLE 5

In a countercurrent extraction system consisting of three percolators connected in series, 3×1,000 parts cassia endosperm flour were continually eluted with an isopropanol/water mixture (50 Vol. %) at a flow rate of 3,000 parts an hour. Each hour, the first percolator in the series was emptied, refilled and made the last in the series. The still-moist cassia endosperm flour was liberated of isopropanol and dried to a residual water content level of 8%. The cassia endosperm flour obtained in this way is slightly colored, odorless and tasteless. Gelling force was 91 g.

EXAMPLE 6

In a device for comminuting solids in the presence of liquids, 1,000 parts cassia endosperm grit was passed repeatedly through the comminution zone while an isopropanol/water mixture (50%) was fed in and removed, and the resulting flour liberated of isopropanol. The subsequent drying to an 8% residual water content level produced a degerminated cassia endosperm flour with slight color, neutral odor and pleasant taste. Gelling force was 91 g.

What is claimed is:

1. A process for producing a cassia endosperm flour which is practically colorless, odorless and tasteless and which has a high synergistic gelling property when combined with carrageenan, xanthan, polyacrylates or mixtures thereof, which comprises
    (a) extracting the endosperm flour of cassia tora having characteristic color, odor and taste with an extraction liquid comprising a mixture of about 5% by weight to about 90% by weight water and an agent selected from the group consisting of alkanol, acetone and mixtures thereof, the extraction proceeding at a temperature of about 25° C. for a sufficient time to provide a flour lacking said characteristic color, odor and taste, and
    (b) drying the resulting cassia endosperm flour.

2. The process of claim 1 wherein the dried flour is finely divided.

3. The process of claim 1 wherein the endosperm is in a whole state or a comminuted state.

4. The process of claim 1 wherein the extracting step is performed at least once.

5. The process of claim 1 wherein the extraction step is performed at least twice.

6. The process of claim 1 wherein the extraction step is performed at least three times.

7. The process of claim 5 wherein the water content of the extraction liquid is decreased in each successive extraction step.

8. The process of claim 6 wherein the water content of the extraction liquid is decreased in each successive extraction step.

9. The process of claim 7 wherein the water content of the extraction liquid used in the first extraction step is from about 40% to about 60% and the water content used in the second extraction step is from about 20% to about 40%.

10. The process of claim 7 wherein the water content of the extraction liquid used in the first extraction step is from about 40% to about 60% and the water content used in the second extraction step is from about 20% to about 40%, and the water content in the third extraction step is from about 5% to about 15%.

11. The process of claim 4 wherein said extraction is performed continuously.

12. The process of claim 5 wherein said extraction is performed continuously.

13. The process of claim 6 wherein said extraction is performed continuously.

14. The process of claim 1 wherein the extraction is conducted at an elevated temperature.

15. The process of claim 1 wherein the extraction liquid further comprises a reducing agent, a soluble alkaline substance or a mixture thereof.

16. The process of claim 4 wherein the extraction is conducted in a countercurrent.

17. The process of claim 5 wherein the extraction is conducted in a countercurrent.

18. The process of claim 6 wherein the extraction is conducted in a countercurrent.

19. The process of claim 9 wherein the extraction liquid further comprises a reducing agent, a soluble alkaline substance or a mixture thereof.

20. The process of claim 10 wherein the extraction liquid further comprises a reducing agent, a soluble alkaline substance or a mixture thereof.

* * * * *